United States Patent [19]

Rekers et al.

[11] Patent Number: 4,846,846

[45] Date of Patent: Jul. 11, 1989

[54] PROCESS FOR PREPARING POLYURETHANE RESINS COLORED WITH ANTHRAQUINONE COLORANTS AND PRODUCTS PRODUCED THEREBY

[75] Inventors: John W. Rekers, Spartanburg; John W. Miley, Campobello, both of S.C.

[73] Assignee: Milliken Research Corporation, Spartanburg, S.C.

[21] Appl. No.: 210,887

[22] Filed: Jun. 20, 1988

[51] Int. Cl.$^4$ .................................................. D06P 3/24
[52] U.S. Cl. ............................................. 8/515; 8/403; 8/675; 8/678; 8/926; 8/477
[58] Field of Search ............................................. 8/515

[56]  References Cited

U.S. PATENT DOCUMENTS

| | | | |
|---|---|---|---|
| 3,157,633 | 11/1964 | Kuhn | 534/729 |
| 3,994,835 | 11/1976 | Wolf et al. | 8/584 |
| 4,132,840 | 1/1979 | Hugl et al. | 8/477 |
| 4,137,243 | 1/1979 | Farmer | 260/378 |
| 4,284,729 | 8/1981 | Cross et al. | 521/158 |
| 4,507,407 | 3/1985 | Kluger et al. | 521/113 |

Primary Examiner—A. Lionel Clingman
Attorney, Agent, or Firm—Terry T. Moyer; H. William Petry

[57] ABSTRACT

A process for coloring polyurethane resins made by a polyaddition reaction of a polyol and an isocyanate is provided, which comprises adding to the reaction mixture before or during the polyaddition reaction a reactive coloring agent suitable for incorporation in the resin with the formation of covalent bonds, said coloring agent having the formula:

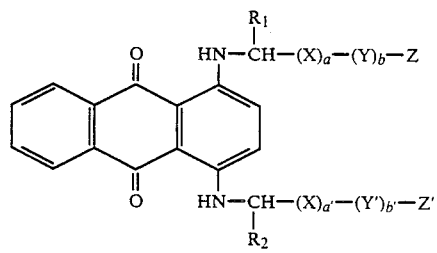

in which $R_1$ and $R_2$ are independently selected from an alkyl group having from 1 to about 12 carbon atoms, X is —$CH_2$—, a and a' are integers from 1 to about 6, and Y and Y' are independently selected from polymeric units of hydroxy alkylenes or alkylene oxide monomers selected from ethylene oxide, propylene oxide, butylene oxide, cyclohexene oxide, or glycidol, b and b' are independently either 0 or 1, and Z and Z' are reactive groups independently selected from —OH, —$NH_2$, or —SH.

7 Claims, No Drawings

PROCESS FOR PREPARING POLYURETHANE RESINS COLORED WITH ANTHRAQUINONE COLORANTS AND PRODUCTS PRODUCED THEREBY

This invention relates to a process for preparing colored polyurethane resins, particularly foams, and the products produced thereby. Specifically, this invention relates to a process for in situ coloration of polyurethane resins in brilliant, stable, and essentially nonmigrating blue shades through the use of reactive 1,4-bis-sec-alkylaminoanthraquinone colorants.

It is known that polyurethane resins, produced by the reaction of a polyol and an isocyanate, may be colored by adding a pigment or dyestuff to the resin. When, however, certain thermoset materials such as polyurethanes are colored with a pigment, the resulting product may be only slightly tinted at normal pigment concentrations, and may thus require larger, undesirable amounts of pigment if a dark hue is to be attained. This phenomenon is particularly apparent in the case of polyurethane foams. On the other hand, if a conventional dyestuff is employed to color the thermoset product, water resistance, oil resistance, and/or resistance to migration of the dyestuff may often be disadvantageously inadequate. When such a dye is used as a coloring agent, it is difficult to prevent bleeding of the dye from the colored resin product. Thermosetting resin products, such as polyurethanes, however, which have been colored with a dyestuff, have certain advantages. Particularly, such colored products may, for instance, possess a clearer hue, and exhibit improved transparency characteristics, both of which are important commercial attributes.

Dyes rather than pigments are preferred for use in coloring polyurethane resins because each molecule of a dye imparts color to the product. Conversely, only the surface molecules of pigment particles impart color. From the standpoint of utilization, then, dyes are more effective than pigments. Due to the above-noted shortcomings of dyes, however, pigments have historically been used extensively.

Other approaches to the coloration of polyurethanes specifically are set forth in U.S. Pat. Nos. 3,994,835 to Wolf, et al., and 4,132,840 to Hugl, et al. Wolf, et al., discloses the addition of dispersions of dyestuffs containing at least one free amino or hydroxyl group capable of reacting with the isocyanate under the conditions of the polyaddition reaction during polyurethane production. Hugl, et al., disclose the coloration of polyurethane resins with dyestuffs having the formula:

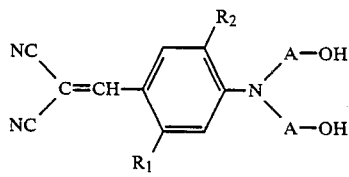

wherein $R_1$ is hydrogen, halogen, optionally substituted $C_1$-$C_4$ alkyl, optionally substituted $C_1$-$C_4$ alkylcarbonylamino and $R_2$ denotes hydrogen, optionally substituted $C_1$-$C_4$ alkoxy, while A and B denote optionally branched alkylene chains which can be identical or different and preferably have from 2 to about 6 carbon atoms.

Thus, it is known that polyurethanes may be colored advantageously with dyes, provided that co-reactive dyes are used. This method has deficiencies, however, with regard to solubility and compatibility of the dyes with the polyurethane reaction mixture.

One definite improvement in prior art techniques is set forth in commonly assigned U.S. Pat. No. 4,284,729 to Cross, et al., in which a liquid polymeric colorant is added to the reaction mixture during production of a thermoset resin. Cross, et al., determined that a liquid, reactive, polymeric colorant could be added before or during the polyaddition reaction to achieve desired coloration of the thermoset resin. The specific polymeric colorant of Cross, et al., has the formula:

R(polymeric constituent - X)$_n$ wherein R is an organic dyestuff radical; the polymeric constituent is selected from polyalkylene oxides and copolymers of polyalkylene oxides in which the alkylene moiety of the polymeric constituent contains 2 or more carbon atoms and such polymeric constituent has a molecular weight of from about 44 to about 1500; X is selected from —OH, —NH$_2$ and —SH, and n is an integer of from about 1 to about 6. The liquid coloring agent is added to the reaction mixture in an amount sufficient to provide the intended degree of coloration to the thermoset resin.

Even though the Cross, et al., polymeric colorant represents vast improvement over prior art techniques, certain problems remain with regard to coloration of polyurethane resins, and foams, in particular. During the complex reactions experienced in producing thermosetting resins, such as polyurethane foams, interactions may occur between certain substituents of the colorant and reactive components of the reaction mixture. In polyurethane foam production specifically, a careful balance must be maintained throughout the reaction to achieve the desired end product. Deleterious interactions may often occur between the coloring agent and reactive components such as isocyanates, metal catalysts, amines, and flame retardants. These interactions may result in the production of foam which does not conform to the desired product specifications with regard to appearance, cell structure, density, and physical properties. In addition, the final product may exhibit poor stability to certain conditions.

In summary, it is known that polyurethane resins may be provided with coloration by in situ coloration with colorants possessing reactive end groups. It is also known that the reactive colorants may be polymeric and be liquids, and that they may be compatible with the polyurethane reaction mixture. It is also known that certain colorants may not be used advantageously for in situ coloration of polyurethanes due to adverse interactions with other ingredients in the polyaddition reaction mixture.

The 1,4-dialkylaminoanthraquinones represent a particularly useful class of coloring agents for polymers. Such chromophores are often blue in shade, are generally quite brilliant, and may possess desirable stability properties, especially to heat and light. Thus, for example, 1,4-dialkylaminoanthraquinones have been used to color polyesters, polyamides, acrylics, and polystyrenes, among others. In polyurethane applications, however, this class of colorant has not found widespread use because of certain problems resulting from adverse interaction of the colorant with other necessary ingredients in the polyurethane reaction mixture, especially isocyanates and metal catalysts.

Because 1,4-dialkylaminoanthraquinones are highly useful coloring agents, it would be very desirable to provide a process for in situ coloration of polyurethanes with these colorants in which the aforementioned deficiencies were overcome.

Thus, the present invention provides a process for in situ coloration of polyurethane resins using 1,4-dialkylaminoanthraquinone colorants. Specifically, the present invention provides a process for in situ coloration of polyurethanes using 1,4-bis-sec-alkylaminoanthraquinone colorants having the formula:

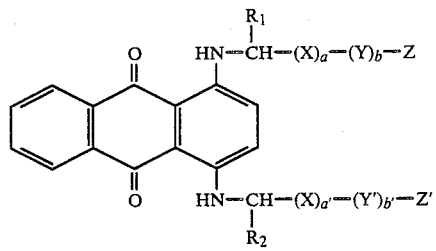

in which $R_1$ and $R_2$ are independently selected from an alkyl group having from 1 to about 12 carbon atoms, X is —CH$_2$—, a and a' are integers from 1 to about 6, and Y and Y' are independently selected from polymeric units of hydroxy alkylenes or alkylene oxide monomers selected from ethylene oxide, propylene oxide, butylene oxide, cyclohexane oxide, or glycidol, b and b' are independently either 0 or 1, and Z and Z' are reactive groups independently selected from —OH, —NH$_2$, or —SH.

Of importance in the invention is that the carbon atom directly attached to the amino nitrogen of the anthraquinone structure be secondary. While the inventors are not to be limited by any particular theory or mechanism, it is believed that the steric hindrance resulting from this structure protects the colorant from significant adverse interaction with reactive ingredients in the polyurethane reaction mixture during in situ coloration.

The polymeric units Y and Y' may be used to provide to the colorant the desired physical properties, solubility, compatibility, or reactivity appropriate to the process of the present invention. Thus, the polymeric units Y and Y' may have a wide variety of compositions to accomplish the objects of the invention. Typical of such polymeric units are the hydroxy alkylenes, polymeric epoxides, such as the polyalkylene oxides, and copolymers thereof. Polyalkylene oxides and copolymers of same which may be employed to provide the colorants of the present invention are, without limitation, polyethylene oxides, polypropylene oxides, polybutylene oxides, polycyclohexene oxides, and polyglycidols, and block or random copolymers of the above. Further, such polymeric units generally have an average molecular weight in the range of from about 44 to 2500, preferably from about 88 to about 1400.

The reactive groups Z and Z' may be selected from —OH, —NH$_2$, or —SH. These groups are generally the terminal hydroxy group of the polyalkylene oxide polymeric unit, and this is preferred. Alternatively, this group may be modified synthetically to provide other reactive groups, such as amino or thiol.

A most preferred reactive colorant for use in the process of the present invention has the formula:

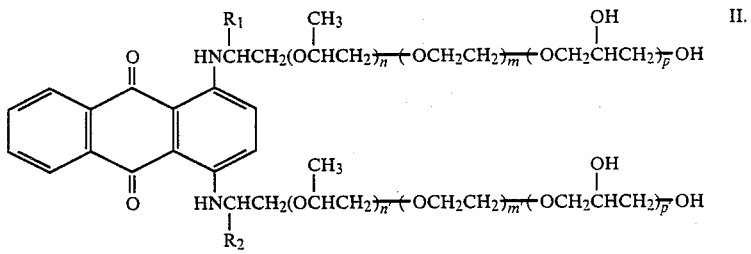

in which $R_1$ and $R_2$ are as defined above, and n, n', m, m', p, and p' have a value of from 0 to about 40.

Colorants used in the process of the present invention are preferably liquid materials at ambient conditions, and if not, are soluble in the reaction mixture of the process.

The present invention also relates to certain polymeric, anthraquinone colorants. More particularly, these colorants may be described as having the general formula set forth in I above wherein b is 1, that is they include polymeric units. More preferred colorants may be described as having the formula set forth in II above wherein the sum of n, m and p is at least 1 and the sum of n', m' and p' is also at least 1.

Any suitable procedure may be employed to produce the reactive 1,4-bis-sec-alkylaminoanthraquinones colorants for use in the present invention. Thus, for example, procedures set forth in U.S. Pat. Nos. 2,311,065 (McNally, et al.) and 4,170,564 (Brendle) are acceptable. Generally, the procedure consists of condensation of at least two moles of a suitable sec-alkyl primary amine compound with 1 mole of leucoquinizarin, or 1 mole of a mixture of leucoquinizarin and quinizarin, followed by oxidation of the leuco dyes to the anthraquinone colorants of the present invention. The leucoquinizarin may be formed in situ by reduction of quinizarin with, for example, zinc or hydrosulfite reducing agents. Catalysts may be employed to facilitate the condensation reaction, which is usually somewhat slower than the corresponding reaction with primary alkylamines. In this regard, boric acid may be an especially beneficial catalyst. Generally, polar solvents are preferred for the condensation reaction, water or alcohols being most preferred. Reaction times and temperatures may vary considerably depending on the specific colorant being produced. Usually temperatures in the range of about 70° C. to about 150° C. for about 2 to 48 hrs. are preferred. When the condensation reaction is complete, the leuco dyes may be oxidized with any suitable oxidant. Air is especially preferred for the reaction, the oxidation generally being complete after only a few hours at moderate temperatures. Finally, the oxidized colorant is isolated and purified, if necessary.

The amines used to prepare the colorants employed in the process of the present invention are advantageously prepared by amination of secondary hydroxyl terminated polyalkyleneoxides. Suitable procedures are set forth in U.S. Pat. No. 3,654,370 (Yeakey) and U.S. patent application Ser. No. 135,421, (Miley and Rekers), filed Dec. 21, 1987.

Other methods are available to prepare the colorants of the process, and these are known to those skilled in the art.

According to the process of the invention, the reactive colorant may be incorporated into the resin by simply adding it to the reaction mixture or to one of the components of the reaction mixture before or during the polyaddition reaction. For instance, for coloration of polyurethane resin, the colorant may be added to the polyol or even in some instances to the polyisocyanate component of the reaction mixture either before or during polyurethane formation. The subsequent reaction may be carried out in the usual manner, i.e., in the same way as for polyurethane resins which are not colored.

The process of the present invention is quite advantageous for the production of polyurethane foams in which several reactions generally take place. First an isocyanate such as toluene diisocyanate is reacted with a polyol such as polypropylene glycol in the presence of heat and suitable catalyst. If both the isocyanate and the polyol are difunctional, a linear polyurethane results, whereas should either have functionalities greater than two, a cross-linked polymer will result. If the hydroxyl compound available to react with the —NCO group is water, the initial reaction product is a carbamic acid which is unstable and breaks down into a primary amine and carbon dioxide.

Since excess isocyanate is typically present, the reaction of the isocyanate with the amine generated by decarboxylation of the carbamic acid occurs, and if controlled, the liberated carbon dioxide becomes the blowing agent for production of the foam. Further, the primary amine produced reacts with further isocyanate to yield a substituted urea which affords strength and increased firmness characteristics to the polymer.

In general amine and tin catalysts are used to delicately balance the reaction of isocyanate with water, the blowing reaction, and the reaction of isocyanate with polymer building substituents. If the carbon dioxide is released too early, the polymer has no strength and the foam collapses. If polymer formation advances too rapidly a closed cell form results which will collapse on cooling. If the colorant or another component reacts to upset the catalyst balance poorly formed foam will result.

Additionally, the substituted urea reacts with excess isocyanate, and the urethane itself reacts with further isocyanate to cross link the polymer by both biuret and allophanate formation. Foams colored by the present process may be soft, semi-rigid, or rigid foams, including the so called polyurethane integral skin and microcellular foams.

Coloring agents suitable for use in the process of the present invention are reactive coloring agents, and may be added to the reaction mixture, or to one of the components thereof. When in liquid form, colorants of the present invention may be added as one or more of the components of the reaction mixture. Conversely when in oil or powder forms, the colorants are first added to one of the reactive components and are carried thereby, or conversely are dissolved in a solvent carrier and added as a separate component. Obviously liquids have significant processing advantages over solids, and may, if desired, be added directly to the reaction mixture wherefore no extraneous nonreactive solvent or dispersing agent is present. The present process may, therefore, provide unusual and advantageous properties in the final thermoset resin product.

Polyurethane products which may be colored according to the process of the present invention are useful for producing shaped products by injection molding, extrusion or calendering and may be obtained by adding the coloring agent to the polyol or diol component of the reaction mixture, or to one of the other components, although addition to the polyol component is preferred. The polyols may be polyesters which contain hydroxyl groups, in particular reaction products of dihydric alcohols and dibasic carboxylic acids, or polyethers which contain hydroxyl groups, in particular products of the addition of ethylene oxide, propylene oxide, styrene oxide or epichlorohydrin to water, alcohols or amines, preferably dialcohols. The coloring agent may also be admixed with the so-called chain extending diols, e.g., ethylene glycol, diethylene glycol and butane diol. In general, it is desirable not to use more than about 20 percent by weight of coloring agent based on the weight of polyol. In most cases very strong colorations are produced with a small proportion of the coloring agent. For example, from about 0.1 to about 5 percent, preferably 0.5 to 2 percent by weight liquid coloring agent may be utilized based on the weight of polyol.

The preferred reactive colorants used in the process of the invention may be soluble, for instance, in most polyols which would be used in polyurethanes, and in themselves. This property may be particularly valuable for three reasons. First, this solubility may permit rapid mixing and homogeneous distribution throughout the resin, thus eliminating shading differences and streaks when properly mixed. Second, the colorant may have no tendency to settle as would be the case with pigment dispersions. Third, it is possible to prepare a blend of two or more colors which provides a wide range of color availability.

The reactive coloring agents used in the present process may also be of considerable value in reaction injection molding (RIM) applications. The RIM process is a method of producing molded urethanes and other polymers wherein the two reactive streams are mixed while being poured into a mold. Upon reaction, the polymer is "blown" by chemicals to produce a foamed structure. This process may be hindered by the presence of solid particles, such as pigments. The present invention may not cause this hindrance because there are no particles in the system and the colorant becomes part of the polymer through reaction with one of the components.

The following examples serve to further illustrate the subject matter of the present invention, but are not to be construed as limiting the scope thereof. Unless otherwise indicated all parts and percentages, are by weight.

EXAMPLES 1-15

The general procedure for preparation of 1,4-dialkylaminoanthraquinone colorants is illustrated by this example.

A mixture of 0.5 moles of the appropriate primary or secondary alkylamine, 0.15 moles of quinizarin, 0.05 moles of leucoquinizarin, and 150 ml of water are stirred and heated to 95° C. under an inert atmosphere.

Progress of the reaction is followed by monitoring the relative intensities of the visible anthraquinone absorbances at approximately 590 and 635 nm. When the ratio of these absorbances stabilizes at 0.8-0.9, the leuco dyes are oxidized with a gentle air sparge at 70°-75° C. Solid products are isolated by filtration, washed with water, and recrystallized if necessary. Liquid products are isolated by extraction with methylene chloride. The methylene chloride extract is washed (dilute acid, 5% sodium bicarbonate solution, and water) and stripped to give the liquid colorant.

The following 1,4-dialkylamino anthraquinone colorants were prepared using the general procedure outlined above.

while foams which showed any color loss were graded "fail".

The following results were obtained on the colorants of Examples 1-15.

| Colorant of Example # | 1° or 2° Alkylamino Substituent | Test Result |
|---|---|---|
| 1 | 2° | PASS |
| 2 | 2° | PASS |
| 3 | 1° | FAIL |
| 4 | 1° | FAIL |
| 5 | 2° | PASS |
| 6 | 2° | PASS |
| 7 | 1° | FAIL |
| 8 | 2° | PASS |

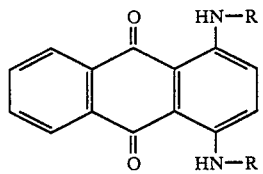

| Ex. # | R | m.p. (°C.) | Color Value* (Methanol) |
|---|---|---|---|
| 1. | $CH(CH_3)_2$ | 179-180° | 60.0 |
| 2. | $CH(CH_3)CH_2CH_3$ | 155-158° | 60.3 |
| 3. | $CH_3$; $CH_2CH_2OH$ (mixed) | 164-167° | 64.2 |
| 4. | $CH_2CH_2OH$ | 242-244° | 58.0 |
| 5. | $CH(CH_3)CH_2OH$ | 224-226° | 54.0 |
| 6. | $CH(CH_2CH_3)CH_2OH$ | 208-210° | 50.8 |
| 7. | $CH_2CH_2CH_2(OCH_2CH)_2OH$ | 48-55° C. | 29.8 |
| 8. | $CH(CH_3)CH_2[OCH(CH_3)CH_2][OCH_2CH_2]_4O-nB_4$ | Liquid | 18.6 |
| 9. | $CH(CH_3)CH_2 [OCH(CH_3)CH_2]_2[OCH_2CH_2]_4OCH_3$ | Liquid | 16.0 |
| 10. | $CH(CH_2CH_3)CH_2(OCH_2CH_2)_4OH$ | Liquid | 23.1 |
| 11. | $CH(CH_2CH_3)CH_2(OCH_2CH_2)_{7.5}OH$ | Liquid | 8.4 |
| 12. | $CH(CH_3)CH_2[OCH(CH_3)CH_2]_2OCH_2CH(OH)CH_2OH$ | Liquid | 13.8 |
| 13. | $CH(CH_3)CH_2[OCH(CH_3)CH_2]_3OCH_2]_3OCH_2CH(OH)CH_2OH$ | Liquid | 19.4 |
| 14. | $CH(CH_3)CH_2[OCH(CH_3)CH_2]_2[OCH_2CH_2]OCH_2CH(OH)CH_2OH$ | Liquid | 13.6 |
| 15. | $CH(CH_3)CH_2[OCH(CH_3)CH_2]_3[OCH_2CH_2]_4OCH_2CH(OH)CH_2OH$ | Liquid | 13.7 |

*Absorbance of 1.00 g/l solution at λ max.; all colorants had characteristic anthraquinone spectra with λ max between 633 and 645 nm.

EXAMPLE 16

This example illustrates the use of 1,4-dialkylaminoanthraquinone colorants for in situ coloration of polyurethane, and shows that only the 1,4-bis-sec-alkylamino derivatives are stable to the polyurethane reaction mixture.

Each of the colorants from Examples 1-15 was diluted with the appropriate amount of N-methylpyrrolidone to give a solution color value of 8.0. Solids were dissolved by gentle warming. The diluted colorants were then incorporated into polyurethane foams using the following formulation:

| | |
|---|---|
| Niax 16-56 (Union Carbide) | 100 g |
| Water | 4.8 g |
| Dabco 33LV (Air Products) | 0.31 mL |
| T-9 Catalyst (Air Products) | 0.20 mL |
| L-520 Silicone | 1.5 mL |
| Dichloromethane | 5.4 mL |
| Toluenediisocyanate | 57.5 mL |
| Colorant | 0.4 g |

The foams were cured for one hour at 160° C., allowed to cool, and then cut open. Each foam was examined for color uniformity and discoloration. Foams showing no color deterioration were graded "pass",

| 9 | 2° | PASS |
| 10 | 2° | PASS |
| 11 | 2° | PASS |
| 12 | 2° | PASS |
| 13 | 2° | PASS |
| 14 | 2° | PASS |
| 15 | 2° | PASS |

EXAMPLE 17

This example shows that colorants not containing reactive groups are readily extracted from polyurethane foam.

A 4 g sample of each foam which had been judged "PASS" in the previous example was immersed in 100 mL of methanol for 24 hours. The quantity of extracted colorant was then estimated by spectrophotometer analysis of the methanol extract.

The following results were obtained:

| Colorant of Example # | % Colorant Extracted |
|---|---|
| 1 | >75% |
| 2 | >75 |
| 5 | <10 |
| 6 | <10 |
| 8 | >75 |
| 9 | >75 |
| 10 | <10 |

-continued

| Colorant of Example # | % Colorant Extracted |
| --- | --- |
| 11 | <10 |
| 12 | <10 |
| 13 | <10 |
| 14 | <10 |
| 15 | <10 |

What is claimed is:

1. A process for coloring polyurethane resins made by a polyaddition reaction of a polyol and an isocyanate, which comprises adding to the reaction mixture before or during the polyaddition reaction a reactive coloring agent suitable for incorporation in the resin with the formation of covalent bonds, said coloring agent having the formula:

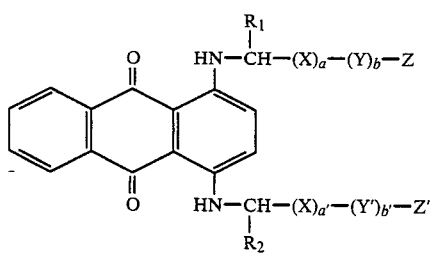

in which $R_1$ and $R_2$ are independently selected from an alkyl group having from 1 to about 12 carbon atoms, X is $-CH_2-$, a and a' are integers from 1 to about 6, and Y and Y' are independently selected from polymeric units of hydroxy alkylenes or alkylene oxide monomers selected from ethylene oxide, propylene oxide, butylene oxide, cyclohexene oxide, or glycidol, b and b' are independently either 0 or 1, and Z and Z' are reactive groups independently selected from $-OH$, $-NH_2$, or $-SH$.

2. The process as defined in claim 1 wherein the polyurethane is a foam.

3. The process of claim 1 wherein said polymeric units have an average molecular weight in the range of from about 44 to 2500.

4. The process of claim 1 wherein said coloring agent has the formula:

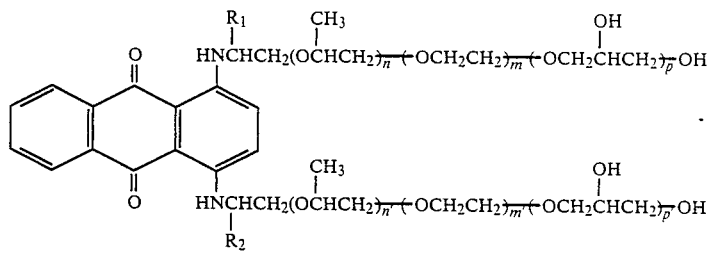

in which $R_1$ and $R_2$ are as defined above, and n, n', m, m', p, and p' have a value of from about 0 to about 40.

5. A colored polyurethane resin which comprises the reaction product of a polyol and an isocyanate and which further includes a covalently bound coloring agent having the formula:

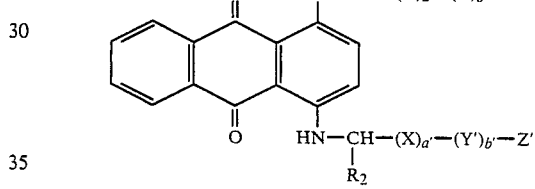

in which $R_1$ and $R_2$ are independently selected from an alkyl group having from 1 to about 12 carbon atoms; X is $-CH_2-$, a and a' are integers from 1 to about 6, and Y and Y' are independently selected from polymeric units of hydroxy alkylenes or alkylene oxide monomers selected from ethylene oxide, propylene oxide, butylene oxide, cyclohexene oxide, or glycidol, b and b' are independently either 0 or 1, and Z and Z' are reactive groups independently selected from $-OH$, $-NH_2$, or $-SH$.

6. The colored resin as defined in claim 5 wherein the resin is foamed.

7. The colored resin as defined in claim 5 wherein the coloring agent has the formula:

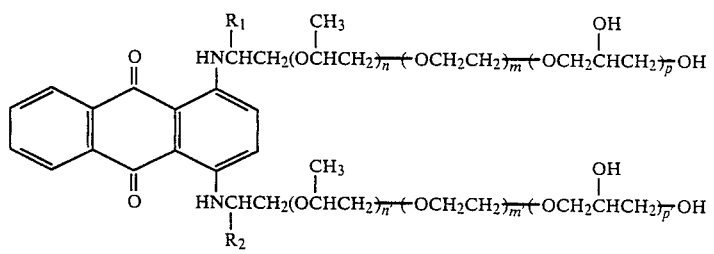

in which $R_1$ and $R_2$ are defined above, and n, n', m, m', p, and p' have a value of from 0 to about 40.

* * * * *